(12) United States Patent
Hammer (10) Patent No.: US 10,125,583 B2
(45) Date of Patent: Nov. 13, 2018

(54) BOREHOLE RECIPROCATING PUMP ASSEMBLY WITH AN AIR CHAMBER ACTING AS A HYDRAULIC SHOCK ABSORBER FOR THE PUMPED FLUID

(71) Applicant: Wendell Hammer, Aitkenvale (AU)

(72) Inventor: Wendell Hammer, Aitkenvale (AU)

( * ) Notice: Subject to any disclaimer, the term of this patent is extended or adjusted under 35 U.S.C. 154(b) by 387 days.

(21) Appl. No.: 14/471,942

(22) Filed: Aug. 28, 2014

(65) Prior Publication Data

US 2016/0061013 A1    Mar. 3, 2016

(30) Foreign Application Priority Data

Mar. 26, 2014    (AU) .................. 2014201807

(51) Int. Cl.
| | |
|---|---|
| *E21B 43/12* | (2006.01) |
| *F04D 13/10* | (2006.01) |
| *F03D 9/28* | (2016.01) |
| *F04B 47/02* | (2006.01) |
| *F04B 47/04* | (2006.01) |
| *F03D 13/20* | (2016.01) |

(52) U.S. Cl.
CPC .............. *E21B 43/127* (2013.01); *F03D 9/28* (2016.05); *F03D 13/20* (2016.05); *F04B 47/02* (2013.01); *F04B 47/04* (2013.01); *F04D 13/10* (2013.01); *Y02E 10/721* (2013.01)

(58) Field of Classification Search
CPC ........ E21B 43/127; F04B 47/02; F04B 47/04; F04B 9/08; F04B 9/12; F04B 19/003; F04B 47/12; F04B 11/0008; F04B 11/0016; F04B 11/0025; F04B 11/0091; F03D 9/001; Y02E 10/721; Y02E 10/728
See application file for complete search history.

(56) References Cited

U.S. PATENT DOCUMENTS

| | | | | |
|---|---|---|---|---|
| 2,685,257 | A * | 8/1954 | Goldschmidt | F04B 47/00 417/515 |
| 3,143,968 | A * | 8/1964 | Gallaway | F04B 47/02 166/106 |
| 4,936,383 | A * | 6/1990 | Towner | F04B 11/0008 138/30 |
| 5,186,254 | A * | 2/1993 | van Staden | E21B 23/01 166/105 |
| 7,353,845 | B2 | 4/2008 | Underwood et al. | 138/30 |
| 2004/0140272 | A1* | 7/2004 | Litherland | B01D 17/0214 210/776 |

FOREIGN PATENT DOCUMENTS

DE           875 140 C         6/1953

* cited by examiner

*Primary Examiner* — Devon Kramer
*Assistant Examiner* — Christopher Brunjes
(74) *Attorney, Agent, or Firm* — Stein IP, LLC (57) ABSTRACT

A borehole pump assembly operable in association with for a borehole with a well casing therein, the borehole pump assembly including an elongate pump rod operably connected to a reciprocating drive and mounting a reciprocating pump at the lower end within the well casing and an air chamber provided immediately above the reciprocating pump and concentrically about the pump rod to provide hydraulic shock absorption between the reciprocating pump and a delivery pipeline.

15 Claims, 9 Drawing Sheets

BOREHOLE RECIPROCATING PUMP ASSEMBLY WITH AN AIR CHAMBER ACTING AS A HYDRAULIC SHOCK ABSORBER FOR THE PUMPED FLUID

TECHNICAL FIELD

The present invention relates to borehole pumps and in particular to a down hole air chamber for a borehole pumping assembly.

BACKGROUND ART

When groundwater is deep, or the ground is hard to dig, boreholes are generally quicker and less expensive to construct than dug wells. Most boreholes are lined with either a 100 mm or 150 mm steel or plastic rising main, so the pump must be small enough in diameter to fit down it.

Ideally, bore hole diameters need to be kept small (large boreholes are very expensive to drill) the best way to obtain a larger output from a borehole pump is to increase its stroke. The speed of operation of borehole pumps is usually restricted to about 30 strokes a minute, although a few operate at up to 50 strokes per minute. Higher pumping speeds tend to buckle the long train of pump rods by not giving the pump rods and piston sufficient time to fall back on the down stroke under gravity. Obviously, with any depth of borehole, it is important to avoid compressing the pump rods, or they may buckle and jam against the sides of the rising main.

Most simple borehole pumps are reciprocating pumps. A reciprocating pump moves water in a non-continuous manner, so the water is constantly accelerated and decelerated by the movement of the piston. Very large forces can be created if long pipelines containing a large mass of water are directly connected to a reciprocating pump. This is because the pump piston tries to force the water in the pipeline to move rapidly from rest to speed, and then back to rest; and since water is incompressible it will try and follow the motion of the piston. Therefore reciprocating pumps generally need to be isolated from water in long pipelines, in order to cushion the water in the pipeline from the motion of the piston.

Figure 1A:
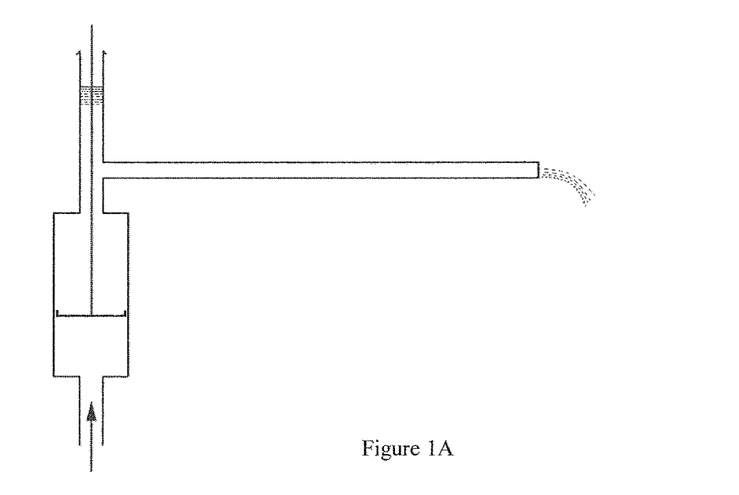
FIG. 1A is a schematic illustration of a first method for isolating reciprocating pumps from pipelines namely utilising an open riser.
Figure 1B:
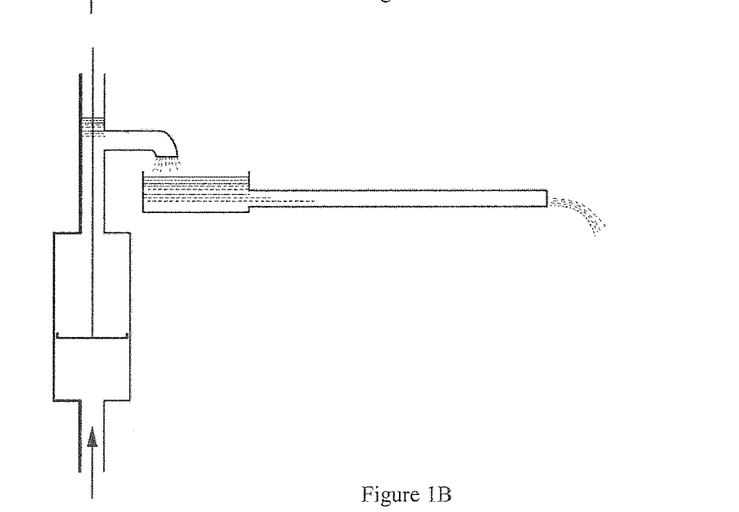
FIG. 1B is a schematic illustration of a first method for isolating reciprocating pumps from pipelines utilising a gravity pipeline from small tank near pump.
Figure 1C:
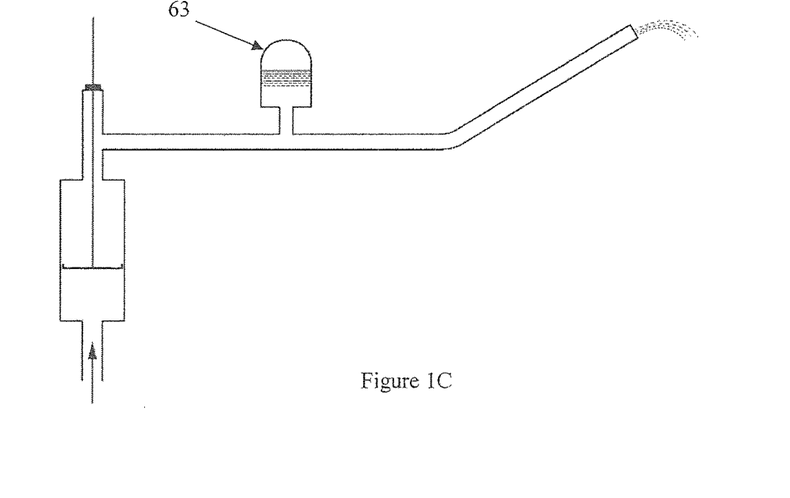
FIG. 1C is a schematic illustration of a first method for isolating reciprocating pumps from pipelines utilising an external air chamber.

Three methods for isolating reciprocating pumps from pipelines are illustrated in FIG. 1, namely:
  A. Open riser (also avoids need for pump rod seal) but only suitable where riser can be above pipeline discharge level;
  B. Gravity pipeline from small tank near pump; and
  C. Compensator tube or stuffing box; necessary when discharge is significantly higher than pump.

When the pump outlet is set close to or above the pipeline discharge level, there is no great problem because the pipeline can be de-coupled from the pump by feeding into a small tank which can then gravity feed the pipeline steadily; see FIG. 1B. Alternatively, a riser open to the atmosphere in the pipeline near to or over the pump can achieve the same effect (as in FIG. 1A); because the pump rod can go down the riser it neatly avoids the need for a seal or stuffing box.

Where the pump delivers into a pipeline which discharges at a significantly higher level, it is generally not practical to have a riser open to the atmosphere at or near the pump, since it obviously would have to extend to a height above the level of the discharge. The solution generally applied in such cases where more than a few meters of suction or delivery line are connected to a reciprocating pump is to place an air chamber or other form of hydraulic shock absorber between the pump and the pipeline (FIG. 1C).

When water from the pump seeks to travel faster than the water in the pipeline it will by preference flow into the air chamber and compress the air inside it. When the piston slows so that the water in the pipeline is travelling faster than that from the pump, the extra water can flow out of the air chamber due to a slight drop in pressure in the pipeline and "fill the gap". In other words, an air chamber serves to smooth the flow by absorbing "peaks" in a reciprocating output and then filling the "troughs" that follow the peaks.

An air chamber is preferably placed as close to the pump as possible but normally outside the borehole in order to allow maintenance of the air chamber and also to minimise the size of the equipment in the borehole.

Further, the friction from the passage of the water within a smaller riser pipe, particularly one with a large bore pump can create problems.

It would therefore be an advantage if the assembly were provided which could keep the water within the rising main moving, reducing the stop/start motion of the water previously associated with reciprocating pumps thereby reducing the chance of rod breakage, strain and wear on the pump barrel and buckets, and minimize the chance that the pump casing can lift within the borehole or well.

It will be clearly understood that, if a prior art publication is referred to herein, this reference does not constitute an admission that the publication forms part of the common general knowledge in the art in Australia or in any other country.

SUMMARY OF INVENTION

The present invention is directed to a borehole pump assembly which may overcome any one or more of the abovementioned disadvantages or offer a useful or commercial choice.

With the foregoing in view, the present invention in one form, resides broadly in a borehole pump assembly operable in association with a windmill, said windmill having a tower frame, a wind driven turbine positioned at an apex of said tower frame, and a borehole with a well casing therein, the borehole pump assembly including an elongate pump rod operably connected to said turbine and mounting a reciprocating pump at the lower end within the well casing and an air chamber provided immediately above the reciprocating pump and concentrically about the pump rod and riser pipe to provide hydraulic shock absorption between the reciprocating pump and a delivery pipeline.

In another aspect, the present invention resides in a borehole pump assembly operable in association with for a borehole with a well casing therein, the borehole pump assembly including an elongate pump rod operably connected to a reciprocating drive and mounting a reciprocating pump at the lower end within the well casing and an air chamber provided immediately above the reciprocating pump and concentrically about the pump rod and riser pipe to provide hydraulic shock absorption between the reciprocating pump and a delivery pipeline.

The present invention will normally be associated with a reciprocating or cyclic pump. Although the pump could be of any type, normally, it will be a piston or bucket pump. Pumps of this type are normally associated with windmills or other simple mechanized drives.

According to preferred principles of operation, water is sucked into the cylinder of the piston or bucket pump through a check valve on the up-stroke, and a piston valve is held closed by the weight of water above it. Simultaneously, the water above the piston is propelled out of the pump. On the down-stroke, a lower check valve is held closed by both its weight and water pressure, while the similar valve in the piston is forced open as the trapped water is displaced through the piston ready for the next up-stroke.

A single-acting pump only discharges water when the piston rises (if mounted vertically) and the down stroke is utilised simply to displace more water into the working space ready for the next stroke. It is possible to arrange things so that while one side of the piston displaces water to discharge it, the other induces more water, so that discharge takes place on both the up and the down stroke. Such pumps are known as "double-acting" pumps and are significantly more productive for their size than single-acting ones.

The pump rod can also be connected to a flywheel via a crank. This is the conventional way of mechanizing a reciprocating piston pump.

Normally, the elongate pump rod is made up of a number of rod lengths joined end to end to form the elongate rod.

Very large forces can be created if long pipelines containing a large mass of water are directly connected to a reciprocating pump. This is because the pump piston tries to force the water in the pipeline to move rapidly from rest to speed, and then back to rest; since water is incompressible it will try and follow the motion of the piston. Therefore reciprocating pumps need to be isolated from water in long pipelines in order to cushion the water in the pipeline from the motion of the piston. Preferably, the air chamber of the invention is used to isolate the reciprocating pump in the borehole from the water in the delivery pipe.

The air chamber of the present invention will preferably be fitted immediately above the pump within the well casing/main riser or rising main in the borehole.

Typically, the air chamber is fitted concentrically about an elongate pump rod and riser pipe. Effectively, the air chamber will act as a part of the riser pipe.

A pump rod extension may be provided as a component of the air chamber in order to be fitted between existing portions of the elongate pump rod during installation of the air chamber.

It is preferred that in the construction of the air chamber of the present invention, nonferrous materials are used. However, prototypes have been constructed of stainless steel and brass or bronze could be considered depending upon cost and strength of materials considerations.

The volume of the air chamber is preferably calculated according to the size of the pump column, well casing, main riser or rising main in use. In order to calculate the volume of the chamber, a variety of factors including the pump size (volume and/or cross-sectional area, the riser size (cross-sectional area), and the rod size, the standing water level in the well or bore as well as the size and length upstroke of the reciprocating drive should be taken into consideration.

A typical size for an air chamber will be around twice the swept volume of the pump, however it may need to be larger to cater for more severe flow irregularities or long delivery lines generally.

If the pump is required to deliver the water from the well or bore a particularly long distance, a secondary air chamber may be provided in conjunction with the borehole a chamber in order to reduce the shock load on the pump and delivery pipe.

Although recharging the air chamber during operation should be unnecessary, the water can be drained from the air chamber during maintenance.

Under certain circumstances, the air in the chamber can gradually dissolve in the water and be carried away until there is no air left and water hammer can then occur. Therefore, the air chamber may be drained to replenish their air by opening a drain plug and an air bleed screw simultaneously, obviously when pumping is not taking place. Suction line air chambers can be replenished by air coming out of solution from the water, although when air-free groundwater is being drawn, a small air sniffing valve may be needed to deliberately leak in a minute flow of air and prevent the chamber losing its air volume.

According to a particularly preferred embodiment of the present invention, the air chamber is provided as an outer chamber, concentrically surrounding an inner chamber and attached relative thereto by a pair of the end pieces. Typically, the respective chambers will be an outer cylindrical housing and an inner cylindrical housing. Typically, the inner cylindrical housing is longer than the outer and extends at least partially through at least one, and preferably both of the end pieces.

Normally, the inner chamber is open at both ends. The inner chamber is preferably substantially the same diameter as the riser pipe in the pumping assembly.

The outer chamber or housing is preferably no larger in diameter than the pump.

The end pieces may be attached in any way to the outer and inner chamber however, threaded attachments are preferred for ease-of-use and maintenance, if required.

One or more openings are provided in an inner housing wall allowing access for water flowing into the inner housing, into the annular volume defined between the inner housing and the outer housing.

As mentioned above, a pump rod section may be provided within the air chamber in order to mount the air chamber relative to the existing elongate pump rod. Typically, the pump rod section will be attached relative to the end pieces as well.

Provision may be made in one or both of the end pieces to allow air to be introduced into the annular volume between the inner chamber and the outer chamber as required to recharge the air chamber. Further, a drain valve may be provided in either or both of the end pieces and/or in the outer housing.

In use, the annular volume in the air chamber will typically hold a volume of air sealed within the annular volume between the inner and outer housings, immediately above the pump in the borehole. On the upstroke of the pump, the water within the pump column applies pressure to the air held in the annular volume to reduce the shock load on the elongate rod and bucket. When the water within the column is moving, and the pressure on the bottom of the column is reduced, or the pump reaches the top of it stroke, the now pressurized air in the annular volume forces the water out of the annular volume and back into the inner housing through the openings in the inner housing wall, and thereby upwardly in the pump column.

This action will typically keep the water within the pump column moving, reducing the stop/start motion of the water previously associated with reciprocating pump and thereby reduce rod breakage, strain and wear on the pump barrel and buckets as well as minimizing the chance that the pump column will lift in the borehole or well.

According to an alternative embodiment, the air chamber may be provided with a partially conical diaphragm extending from an inner, upper portion of the outer cylindrical housing to a lower, outside portion of the inner cylindrical housing.

The diaphragm can be mounted in any way at either the upper or lower end. Typically however a mounting ring will be bonded or otherwise attached to the diaphragm at the upper end in order to allow attachment to the outer cylindrical housing. A mounting shoulder may be provided in order to mount the ring (and therefore the diaphragm) relative to the outer cylindrical housing. This mounting may be accomplished during assembly and may require some temporary deformation of the ring and/or the mounting shoulder.

It is preferred that the lower end of the diaphragm is provided with a shaped section to receive the outside of the inner cylindrical housing. Typically, a portion of the diaphragm may be provided as a flattened section and therefore, the diaphragm itself may be frustoconical in appearance or configuration. Preferably, a circular clamp or similar will be positioned on a lower portion of the inner cylindrical housing about the diaphragm in order to hold the diaphragm closely to the inner cylindrical housing.

In use, and not wishing to be limited by theory, when the diaphragm is fitted to the air chamber of this embodiment, it creates a physical barrier between the air and the water, preventing the water from contacting the air and absorbing air within the chamber. By trapping the air with in a vessel, the pressure within the air chamber of the embodiment can be pre-charged, giving the air chamber a greater usable volume and thereby increasing its capacity. The pressure needed to pre-charge the air chamber will normally be dictated by the head pressure that the air chamber will be subjected to which is related to the depth at which the pump is pumping the water from.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

DESCRIPTION OF EMBODIMENTS

According to a particularly preferred embodiment of the present invention, a borehole pump assembly including an in-hole air chamber immediately adjacent the pump is provided.

Figure 2:
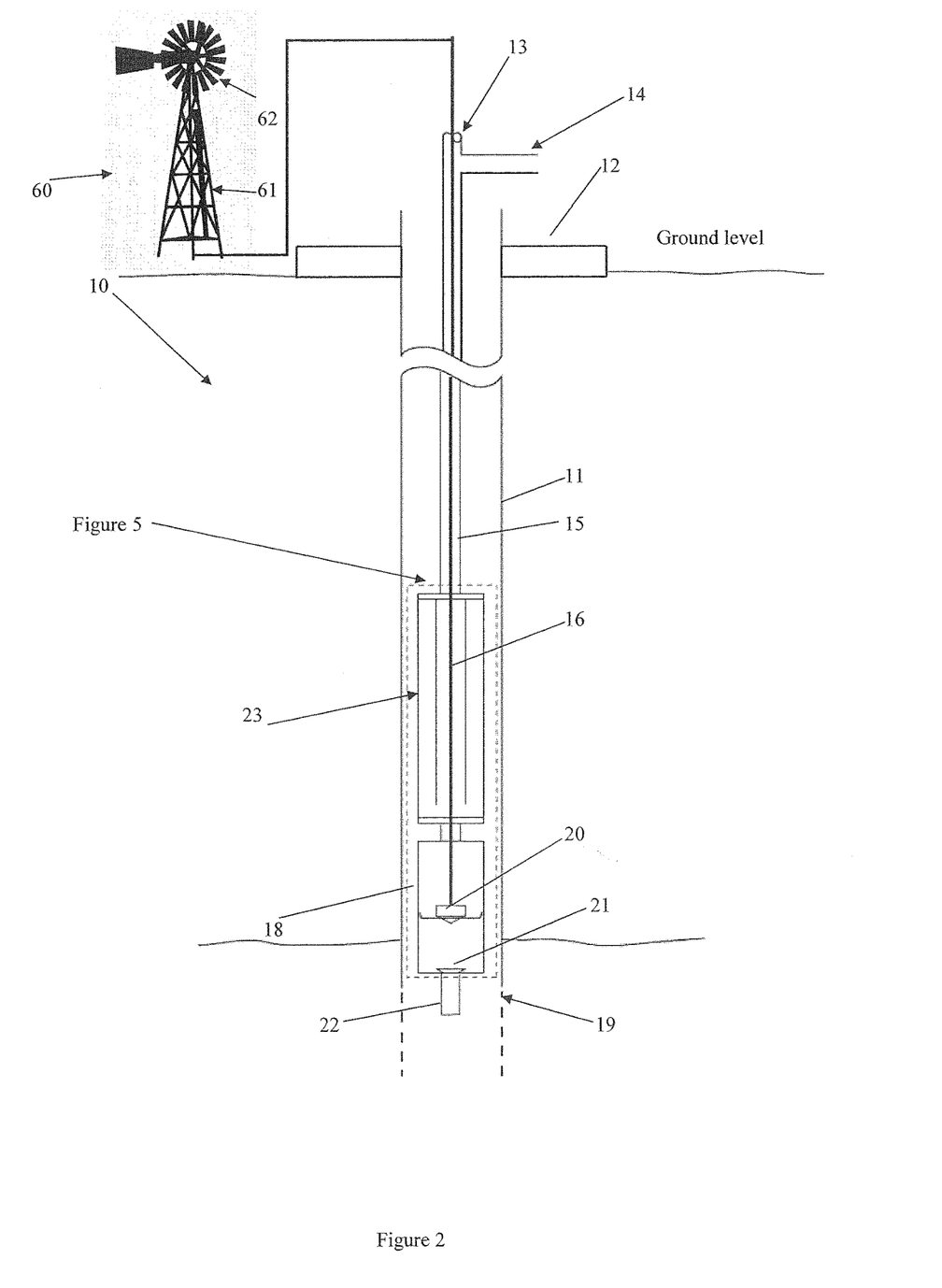
FIG. 2 is a schematic illustration of a typical borehole with a piston pump in it and an air chamber according to a preferred embodiment of the present invention.

As discussed above, a schematic of a borehole pumping assembly illustration the locations of the components relative to one another is included in FIG. 2. The borehole pump assembly is normally operable in association with a windmill 60, said windmill 60 having a tower frame 61 and a wind driven turbine 62 positioned at an apex of said tower frame 61.

If the pump is required to deliver the water from the well or bore a particularly long distance, a secondary air chamber 63 may be provided in conjunction with the borehole a chamber in order to reduce the shock load on the pump and delivery pipe 14.

As illustrated in FIG. 2, the well 10 has a well casing 11 which is located in the ground. The well casing 11 is typically reinforced an upper portion by a concrete slab 12. Above the concrete slab is the wellhead 13 with the water delivery pipe 14 leading away from the well 10.

As illustrated, a riser pipe 15 is located within the well casing 11 extending down below the water table.

An elongate pump rod 16 extends from outside of the wellhead 13 at the top of the well 10 to a location below the water table where the pump 18 is located.

As illustrated, the pump rod 16 is made up of a number of elongate pump rod portions connected end to end relative to one another. The pump rod 16 is linked to a reciprocating drive [not shown] at a position above the wellhead 13.

The well casing below the water table is a slotted casing 19 allowing water from outside the well 10 to enter the well casing and the pump 18 is located in this portion.

The pump in this schematic embodiment includes a pump piston 20 at an upper end of the pump 18 and a pump foot valve 21 at a lower end of the pump 18. An optional strainer 22 is illustrated below the pump foot valve 21 in order to minimize any detritus entering the pump through the pump foot valve 21.

According to the preferred embodiment, an air chamber 23 is located immediately above the pump piston 20 effectively as a part of the riser pipe 15.

Figure 3:
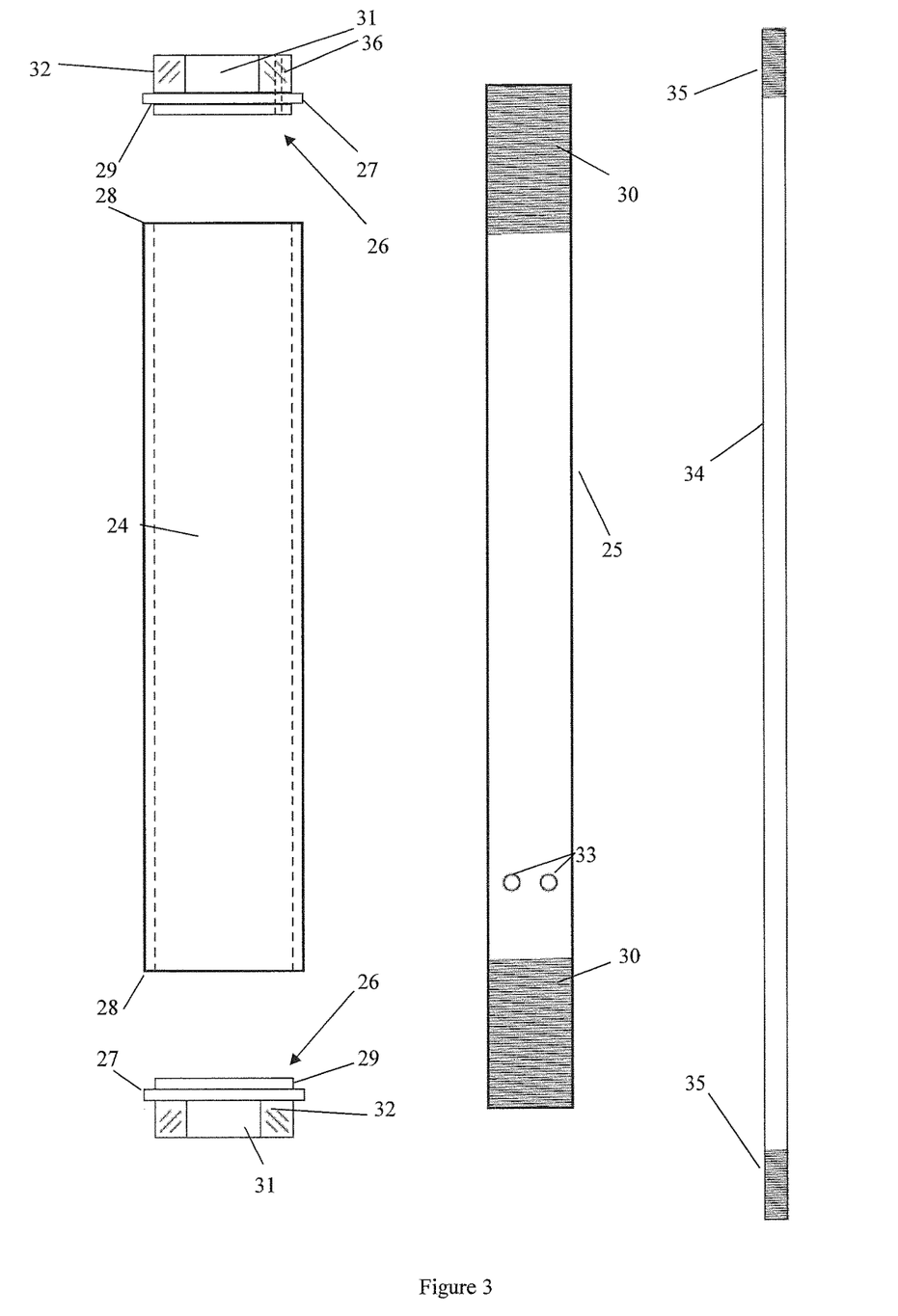
FIG. 3 is an exploded side view of an air chamber according to a preferred embodiment of the present invention.
Figure 4:
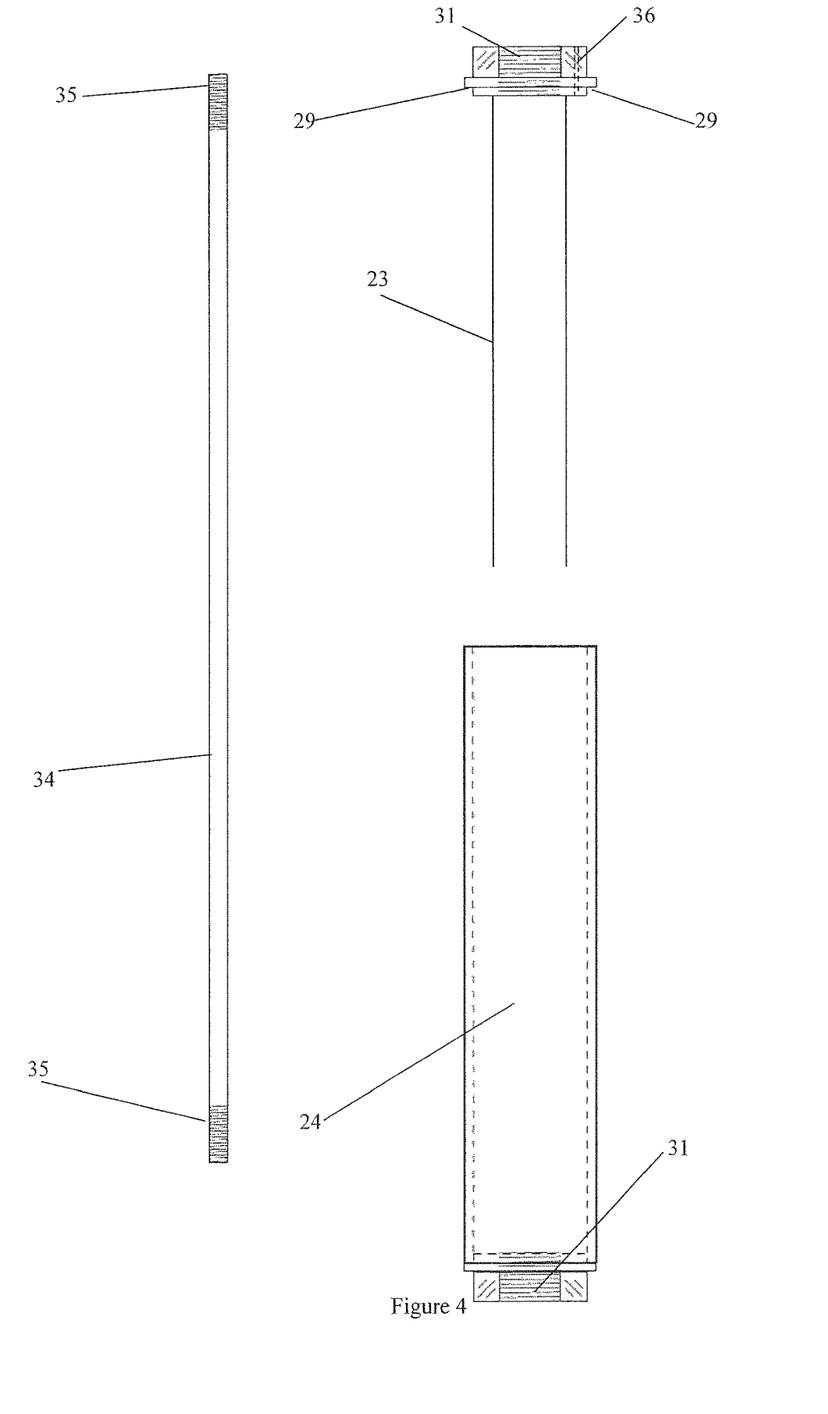
FIG. 4 is an exploded view of an alternative embodiment of an air chamber according to a preferred embodiment of the present invention.

The air chamber 23 is illustrated more particularly in FIGS. 3 and 4. According to the particularly preferred embodiment illustrated, the air chamber 23 is provided as an outer cylindrical housing 24, concentrically surrounding an inner cylindrical housing 25 and attached relative thereto by a pair of the end pieces 26. As illustrated, the inner cylindrical housing 25 is longer than the outer cylindrical housing 24 and extends at least partially through both of the end pieces 26.

The inner cylindrical housing 25 is open at both ends.

The end pieces 26 are attached to the outer 24 and inner cylindrical housing 25. Each end piece has a machined shoulder section 27 in order to seal on to each end piece 26. A circumferential groove 29 is also provided in the machined section 27 in order to mount a sealing ring (obscured) in order to improve the seal with the outer housing 24. Similarly, each end edge 28 of the outer cylindrical housing 24 is machined to provide good seal.

The inner cylindrical housing 25 is provided with an externally threaded section 30 at either end for engaging an internally threaded attachment 31 on each end piece.

As illustrated, each end piece 26 is configured as a large nut, having a number of the flattened surfaces 32 to allow the end piece to be gripped for attachment, particularly to the inner cylindrical housing.

A pair of openings 33 is provided in an inner housing 25 wall allowing access for water flowing into the inner housing 25, into an annular volume defined between the inner housing 25 and the outer housing 24.

As mentioned above, a pump rod extension 34 can be provided within the air chamber 23 in order to mount the air chamber 23 relative to the existing elongate pump rod 16. The illustrated pump rod extension 34 includes a pair of threaded ends 35 in order to locate the air chamber between the pump 18 and the riser pipe 15.

As illustrated in FIG. 3, an air introduction line or entry port 36 is provided in the upper end piece to allow air to be introduced into the annular volume between the inner chamber and the outer chamber as required to recharge the air chamber.

In use, the annular volume in the air chamber 23 holds a volume of air sealed within the annular volume between the inner 25 and outer housings 4, immediately above the pump 18 in the borehole. On the upstroke of the pump 18, the water within the pump column applies pressure to the air held in the annular volume to reduce the shock load on the elongate rod 16 and bucket of the preferred piston pump. When the water within the column is moving, and the pressure on the bottom of the column is reduced, or the pump 18 reaches the top of it stroke, the now pressurized air in the annular volume forces the water out of the annular volume and back into the inner housing 25 through the openings 33 in the inner housing 25 wall, and thereby upwardly in the pump column.

According to an alternative embodiment illustrated in FIGS. 5 to 9, the air chamber is provided with an annular top cap 40 which attaches an upper portion of the inner cylindrical housing 41 to the outer cylindrical housing 42. There is also a bottom cap 50 on the inner side of the outer cylindrical housing 42

Figure 5:
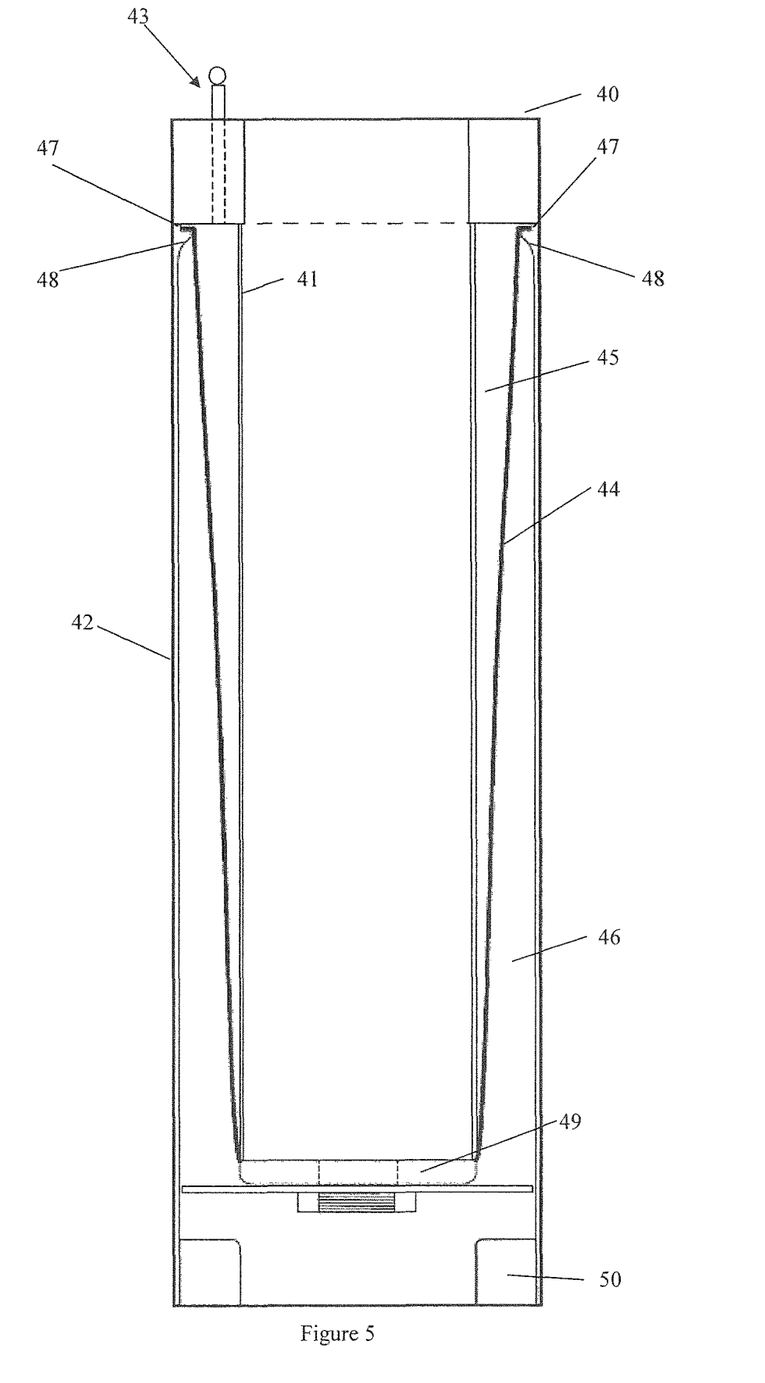
FIG. 5 is a sectional side view of an air chamber according to an alternative embodiment of the present invention.

The upper cap 40 illustrated in FIG. 5 includes a charge valve 43 to allow air to be inserted between the diaphragm 44 and the outer wall of the inner cylindrical housing 41. The diaphragm 44 creates an inner chamber 45 for air and an outer chamber 46 for water.

The diaphragm 44 illustrated is a partially conical diaphragm extending from an inner, upper portion of the outer cylindrical housing 42 to a lower, outside portion of the inner cylindrical housing 41.

The illustrated diaphragm 44 is provided with a mounting ring 47 bonded or otherwise attached to the diaphragm 44 at the upper end in order to allow attachment to the outer cylindrical housing 42. An at least partially circumferential mounting shoulder or lip 48 is provided in order to mount the ring 47 (and therefore the diaphragm 44) relative to the outer cylindrical housing 42. Mounting will normally be accomplished during assembly and may require some temporary deformation of the ring 47 and/or the mounting shoulder 48.

It is preferred that the lower end of the diaphragm 44 is provided with a shaped section to receive the inner cylindrical housing 41. Typically, a portion of the diaphragm 44 can be provided as a flattened section and therefore, the diaphragm 44 itself may be frustoconical in appearance or configuration. Preferably, a circular clamp 49 will be positioned on a lower portion of the inner cylindrical housing 41 about the diaphragm 44 in order to hold the diaphragm 44 closely to the inner cylindrical housing 41.

In use, and not wishing to be limited by theory, when the diaphragm is fitted to the air chamber of this embodiment, it creates a physical barrier between the air and the water, preventing the water from contacting the air and absorbing air within the chamber. By trapping the air with in a vessel, the pressure within the air chamber of the embodiment can be pre-charged, giving the air chamber a greater usable volume and thereby increasing its capacity. The pressure needed to pre-charge the air chamber will normally be dictated by the head pressure that the air chamber will be subjected to which is related to the depth at which the pump is pumping the water from.

FIGS. 6 to 9 illustrate the portion of the invention outlined in dashed line in FIG. 2 but utilising the diaphragm embodiment illustrated in FIG. 5.

Figure 6:
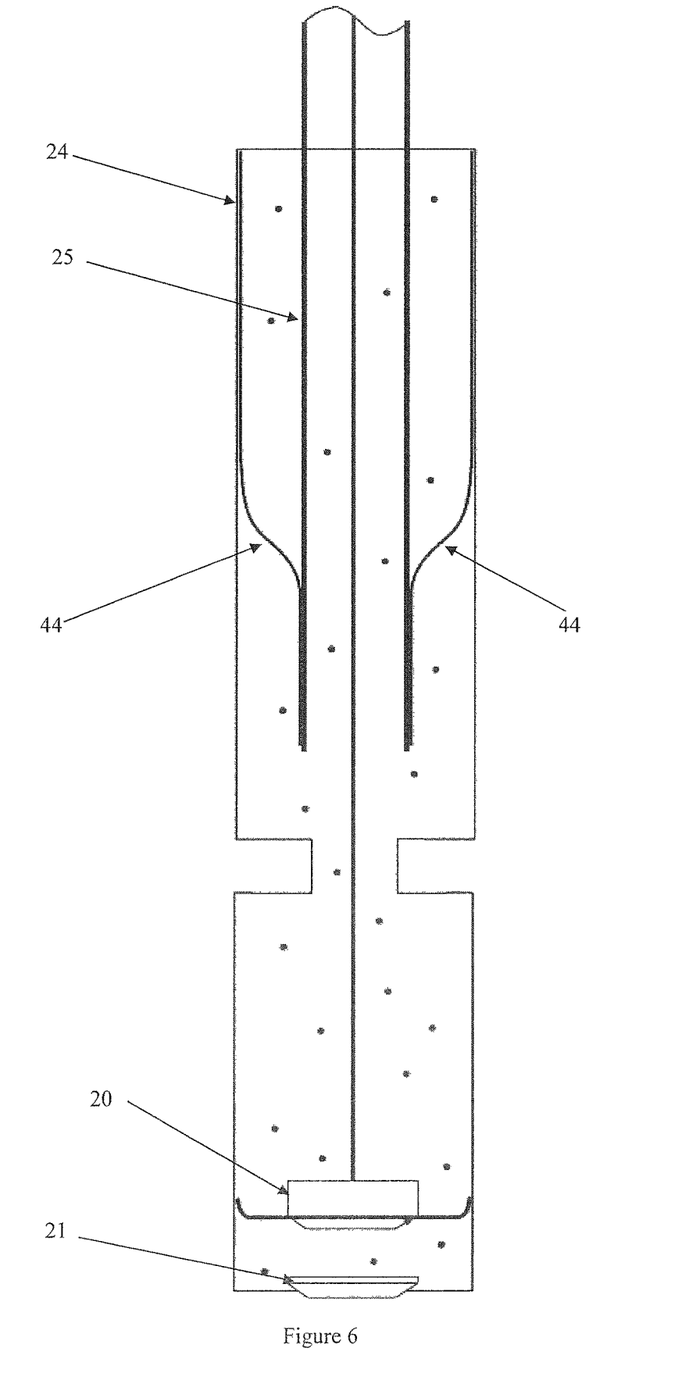
FIG. 6 is a schematic illustration of the air chamber illustrated in FIG. 5 in an insertion stage.

As illustrated in FIG. 6, as the air chamber is lowered into position in the borehole, the static head pressure of the water within the bore will exert some pressure on the diaphragm. The pre-charge pressure in the inner chamber 45 of the air chamber should be greater than the expected pressure of the standing water level to the depth of the pump head by inserting all releasing air using the charge valve 43.

Figure 7:
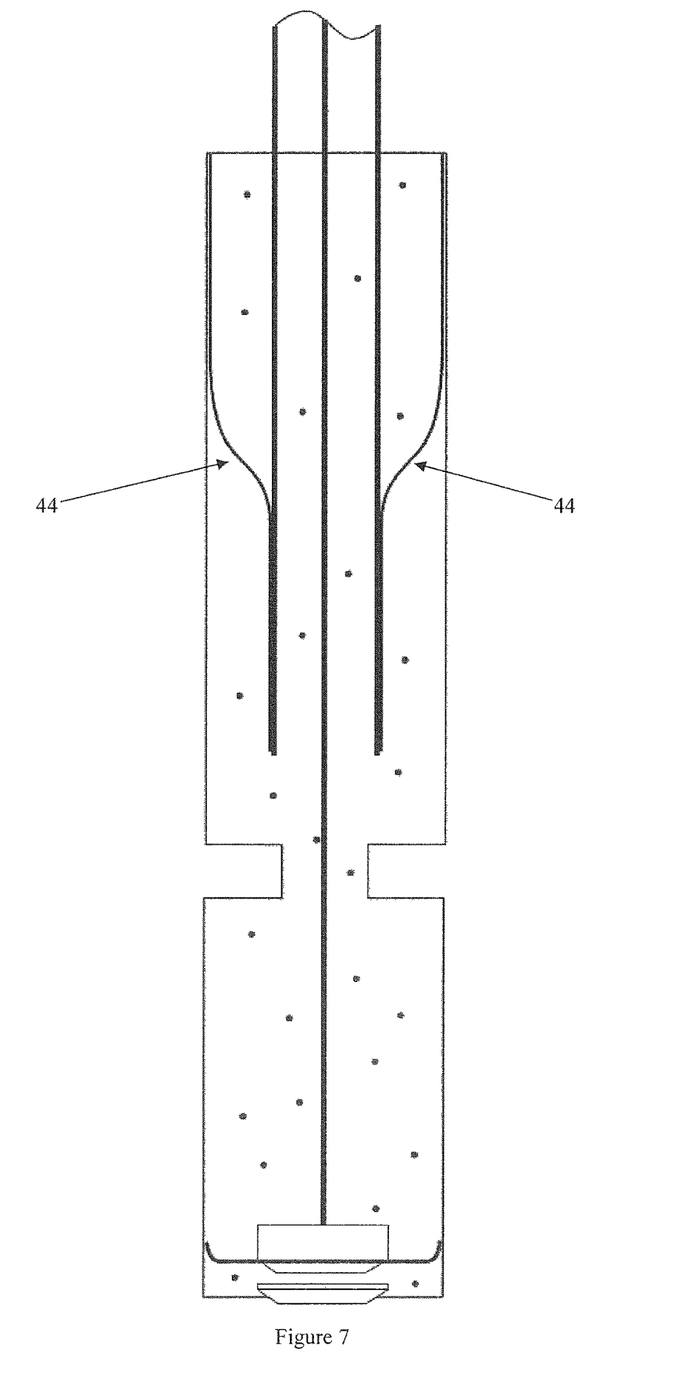
FIG. 7 is a schematic illustration of the air chamber illustrated in FIG. 5 showing operation as the windmill pumps the water up the riser pipe.

As the windmill pumps the water up the rise of pipe, the pressure on the diaphragm 44 increases and forces the diaphragm 44 to further compress the air in the inner chamber 45 until the pressure within the inner chamber 45 equals the total head pressure of the standing column of water when the rise pipe is full. This is illustrated in FIG. 7.

Figure 8:
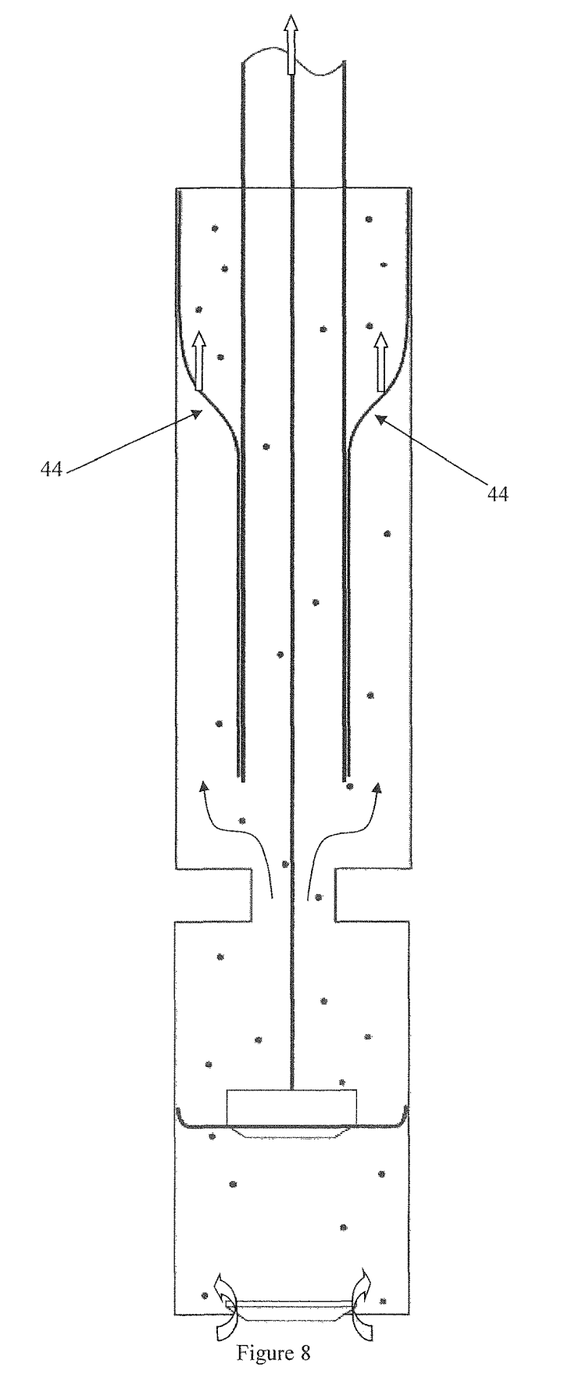
FIG. 8 is a schematic illustration of the air chamber illustrated in FIG. 5 showing operation as the pump plunger forces the water of the riser pipe.

According to FIG. 8, as the pump plunger forces the water up the rise of pipe and into the holding tank, the diaphragm 44 within the air chamber flexes and allows the pressure of the water to compress the air with it in the inner chamber 45 creating a shock absorber affect in the riser pipe 15.

Figure 9:
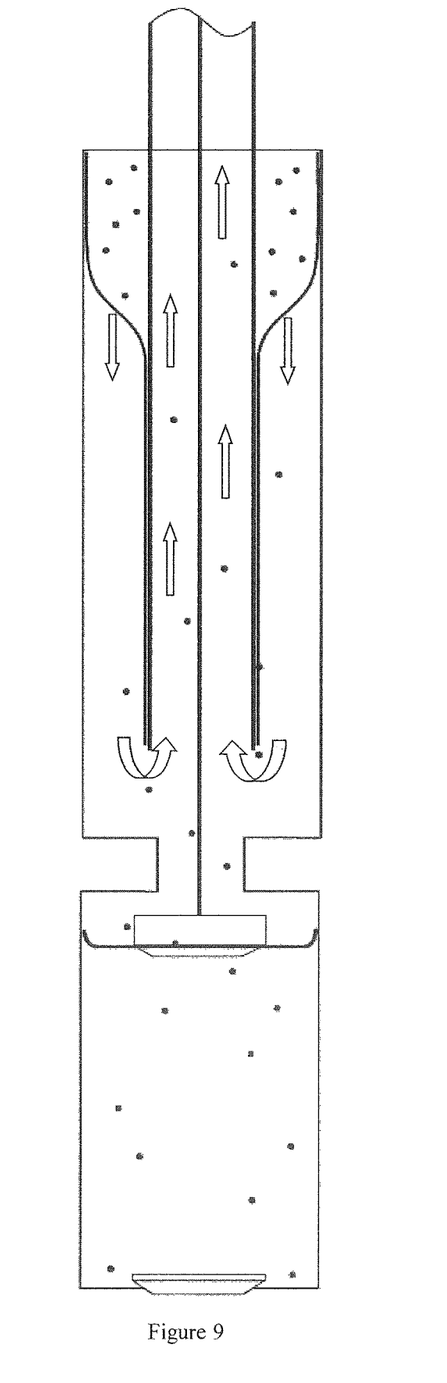
FIG. 9 is a schematic illustration of the air chamber illustrated in FIG. 5 showing operation as the pump reaches the top of its stroke.

When the pump reaches the top of it stroke, the configuration will be similar to that illustrated in FIG. 9 in which the pressure of the water reduces and the air within the inner chamber 45 pushes on the diaphragm 44 to force the water back out of the air chamber and up the riser pipe 15.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

What is claimed is:

1. A borehole pump assembly operable in association with a windmill, said windmill having a tower frame, a wind driven turbine positioned at an apex of said tower frame, and a borehole with a well casing therein, the borehole pump assembly including
   a) an elongate pump rod operably connected to said turbine;
   b) a reciprocating pump mounted at the lower end of the elongate pump rod concentrically about the pump rod within the well casing, the reciprocating pump including a pump housing, a pump piston associated with the elongate pump rod and moving with the elongate pump rod in a reciprocating stroke within the pump housing and a pump foot valve at a lower end of the pump housing;
   c) an air chamber including
      i. an air chamber housing provided immediately above the pump housing and concentrically about the pump rod within the well casing such that liquid flows upwardly from the pump housing into the air chamber housing when forced to by upward movement of the pump piston, the air chamber housing fixed in position relative to the pump housing to remain immediately above the pump housing during the reciprocating stroke of the reciprocating pump to provide hydraulic shock absorption between the reciprocating pump and a delivery pipeline, the air chamber provided as an outer chamber, concentrically surrounding an inner chamber and attached relative thereto by a pair of end pieces wherein the outer chamber and the inner chamber include an outer cylindrical housing and an inner cylindrical housing respectively, the air chamber provided with a partially conical diaphragm connected directly to an inner, upper portion of the outer cylindrical housing and connected directly to a lower, outside portion of the inner cylindrical housing; and
   d) a riser pipe associated with the air chamber housing to deliver liquid upwardly to the delivery pipeline
   wherein the air chamber housing and the pump housing are both larger in diameter than the riser pipe.

2. A borehole pump assembly as claimed in claim 1 wherein a pump rod extension is provided as a component of the air chamber in order to be fitted between portions of the elongate pump rod during installation of the air chamber.

3. A borehole pump assembly as claimed in claim 1 wherein the air chamber is approximately twice a swept volume of the pump.

4. A borehole pump assembly as claimed in claim 1 wherein a secondary air chamber is provided in conjunction with the borehole pump assembly in line with either the riser pipe or the delivery pipeline.

5. A borehole pump assembly as claimed in claim 1 wherein the inner cylindrical housing is longer than the outer chamber and extends at least partially through at least one of the end pieces.

6. A borehole pump assembly as claimed in claim 1 wherein the inner chamber is open at both ends.

7. A borehole pump assembly as claimed in claim 1 wherein the outer chamber is no larger in diameter than the pump housing.

8. A borehole pump assembly as claimed in claim 1 wherein one or more openings are provided in an inner housing wall allowing access for water flowing into the inner housing, into an annular volume defined between the inner housing and the outer housing.

9. A borehole pump assembly as claimed in claim 1 wherein an entry port is provided in one or both of the end pieces to allow air to be introduced into an annular volume between the inner chamber and the outer chamber as required to recharge the air chamber.

10. A borehole pump assembly as claimed in claim 1 wherein a mounting ring is attached to the diaphragm at an upper end in order to allow attachment to the outer cylindrical housing.

11. A borehole pump assembly as claimed in claim 10 wherein a mounting shoulder is provided in order to mount the mounting ring and therefore the diaphragm relative to the outer cylindrical housing.

12. A borehole pump assembly as claimed in claim 11 wherein a lower end of the diaphragm is provided with a shaped section to receive an outside of the inner cylindrical housing.

13. A borehole pump assembly as claimed in claim 12 wherein a portion of the diaphragm is provided as a flattened section and the diaphragm itself is frustoconical in appearance.

14. A borehole pump assembly as claimed in claim 13 wherein a circular clamp is positioned on a lower portion of the inner cylindrical housing about the diaphragm in order to hold the diaphragm closely to the inner cylindrical housing.

15. A borehole pump assembly operable in association with a borehole with a well casing therein, the borehole pump assembly including
   a) an elongate pump rod
   b) a reciprocating pump mounted at the lower end of the elongate pump rod concentrically about the pump rod within the well casing, the reciprocating pump including a pump housing, a pump piston associated with the elongate pump rod and moving with the elongate pump rod in a reciprocating stroke within the pump housing and a pump foot valve at a lower end of the pump housing;
   c) an air chamber including an air chamber housing provided immediately above the pump housing and concentrically about the pump rod, within the well casing such that liquid flows upwardly from the pump housing into the air chamber housing when forced to by upward movement of the pump piston the air chamber housing fixed in position relative to the pump housing to remain immediately above the pump housing during the reciprocating stroke of the elongate pump rod to provide hydraulic shock absorption between the reciprocating pump and a delivery pipeline, the air chamber provided as an outer chamber, concentrically surrounding an inner chamber and attached relative thereto by a pair of end pieces wherein the outer chamber and the inner chamber include an outer cylindrical housing and an inner cylindrical housing respectively, the air chamber provided with a partially conical diaphragm extending from an inner, upper portion of the outer cylindrical housing to a lower, outside portion of the inner cylindrical housing; and
   d) a riser pipe associated with the air chamber housing to deliver liquid upwardly to the delivery pipeline
   wherein the air chamber housing and the pump housing are both larger in diameter than the riser pipe.

* * * * *